US009083564B2

(12) United States Patent
McCarthy et al.

(10) Patent No.: US 9,083,564 B2
(45) Date of Patent: Jul. 14, 2015

(54) SYSTEM AND METHOD OF DELIVERING NOTIFICATIONS

(75) Inventors: Mary McCarthy, San Antonio, TX (US); Tony Haeuser, Aurora, IL (US); Chris Lee, San Antonio, TX (US); Ross Cox, Kyle, TX (US); Scott Pettit, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2196 days.

(21) Appl. No.: 11/249,777

(22) Filed: Oct. 13, 2005

(65) Prior Publication Data

US 2007/0115389 A1 May 24, 2007

(51) Int. Cl.

| | |
|---|---|
| ***H04M 11/00*** | (2006.01) |
| ***H04M 1/64*** | (2006.01) |
| ***H04L 12/66*** | (2006.01) |
| ***H04M 3/533*** | (2006.01) |
| ***H04N 21/254*** | (2011.01) |
| ***H04N 21/4786*** | (2011.01) |
| ***H04N 21/61*** | (2011.01) |
| ***H04N 21/81*** | (2011.01) |

(52) U.S. Cl.

CPC ............... *H04L 12/66* (2013.01); *H04M 3/533* (2013.01); *H04N 21/254* (2013.01); *H04N 21/4786* (2013.01); *H04N 21/6125* (2013.01); *H04N 21/6175* (2013.01); *H04N 21/8126* (2013.01)

(58) Field of Classification Search

CPC ...................................................... H04M 3/533
USPC ........................................... 379/88.25, 93.17
See application file for complete search history.

(56) References Cited

U.S. PATENT DOCUMENTS

| | | | | |
|---|---|---|---|---|
| 5,629,978 | A * | 5/1997 | Blumhardt et al. | 370/271 |
| 5,651,054 | A * | 7/1997 | Dunn et al. | 379/88.11 |
| 5,751,373 | A * | 5/1998 | Ohyama et al. | 725/59 |
| 5,796,394 | A * | 8/1998 | Wicks et al. | 715/751 |
| 5,946,386 | A * | 8/1999 | Rogers et al. | 379/265.09 |
| 6,061,719 | A * | 5/2000 | Bendinelli et al. | 709/218 |
| 6,263,507 | B1 * | 7/2001 | Ahmad et al. | 725/134 |
| 6,314,425 | B1 | 11/2001 | Servinis et al. | |
| 6,323,911 | B1 * | 11/2001 | Schein et al. | 348/552 |
| 6,411,685 | B1 * | 6/2002 | O'Neal | 379/88.14 |
| 6,781,962 | B1 | 8/2004 | Williams et al. | |
| 6,882,709 | B1 * | 4/2005 | Sherlock et al. | 379/90.01 |
| 6,886,030 | B1 * | 4/2005 | Easterbrook et al. | 709/206 |
| 6,944,591 | B1 * | 9/2005 | Raghunandan | 704/235 |
| 7,136,673 | B2 * | 11/2006 | Yukie et al. | 455/557 |
| 7,313,617 | B2 * | 12/2007 | Malik et al. | 709/225 |

(Continued)

OTHER PUBLICATIONS

International Search Report for International Application No. PCT/US06/37389, mailed on Apr. 3, 2007.

(Continued)

*Primary Examiner* — Joseph T Phan
(74) *Attorney, Agent, or Firm* — Toler Law Group, PC

(57) ABSTRACT

The present disclosure is directed to a system and method of delivering notifications. The method can include receiving a communication at a server within an Internet Protocol Television (IPTV) network, where the communication is directed to a destination device outside of the IPTV network. The method can also include identifying the destination device and associating the destination device with a set-top box device. The method can also include transmitting a notification of the communication to the set-top box device via a private data network within the IPTV network.

18 Claims, 8 Drawing Sheets

(56) References Cited

U.S. PATENT DOCUMENTS

| | | | | |
|---|---|---|---|---|
| 7,441,027 | B2 * | 10/2008 | Malik | 709/224 |
| 7,627,305 | B2 * | 12/2009 | Helferich | 455/403 |
| 7,640,301 | B2 * | 12/2009 | Walter | 709/204 |
| 7,664,239 | B2 * | 2/2010 | Groff et al. | 379/93.17 |
| 7,676,473 | B2 * | 3/2010 | Alperin et al. | 707/999.01 |
| 7,787,873 | B2 * | 8/2010 | Karstens et al. | 455/418 |
| 7,823,183 | B2 * | 10/2010 | Mickle et al. | 725/132 |
| 7,835,506 | B2 * | 11/2010 | Groff et al. | 379/90.01 |
| 7,835,757 | B2 * | 11/2010 | Helferich | 455/458 |
| 7,843,314 | B2 * | 11/2010 | Helferich | 340/7.21 |
| 7,889,715 | B2 * | 2/2011 | Criddle et al. | 370/352 |
| 8,745,680 | B2 * | 6/2014 | Brandt et al. | 725/106 |
| 2004/0261130 | A1 | 12/2004 | Leak et al. | |
| 2005/0005275 | A1 | 1/2005 | Stamper et al. | |
| 2005/0027539 | A1 * | 2/2005 | Weber et al. | 704/275 |
| 2005/0050218 | A1 | 3/2005 | Sheldon | |
| 2005/0097213 | A1 | 5/2005 | Barrett et al. | |
| 2005/0210510 | A1 | 9/2005 | Danker | |
| 2008/0109839 | A1 * | 5/2008 | Bruce et al. | 725/25 |

OTHER PUBLICATIONS

Written Opinion of the International Searching Authority for PCT/US06/37389, mailed on Apr. 3, 2007.

(Cable & Satellite International) "Telcos Battling Cable on the Home Front" in: Set-top Boxes (On Line, <URL: www.cable-satellite.com/pdf/features/18-22_may-jun05.pdf>).

* cited by examiner

SYSTEM AND METHOD OF DELIVERING NOTIFICATIONS

FIELD OF THE DISCLOSURE

The present disclosure relates generally to delivering notifications.

BACKGROUND

Television viewing is part of daily life. Many individuals prefer not be interrupted while watching television, but they may desire to monitor telephone calls and other forms of communication, for example, in case of an emergency or to avoid reviewing a large number of new messages at a future time. Nonetheless, the integration of communications with television viewing is uncommon. Technical compatibilities pose challenges when integrating conventional telephone and television networks, in addition to data networks, such as the Internet or wireless networks.

Systems that allow a user to access a store of messages from a television do not provide notifications of communications as they occur. They also typically require that the user interrupt television programming. Moreover, these systems provide, at most, message header information, such as a source or time of a message. This header information does not allow a user to monitor the actual content recorded by a sender of the message. Thus, users often cannot accurately assess—based on the limited header information—whether they should interrupt their television viewing to answer a call or make contact with a party who has left a voice or e-mal message.

DETAILED DESCRIPTION OF THE DRAWINGS

A set-top box within an IPTV system is disclosed and can include a processor and a memory accessible to the processor. A computer program can be embedded in the memory and can contain instructions to receive a notification of a communication to a destination device outside of the IPTV system, where the notification is received at the set-top box device via a private network within the IPTV network.

In another embodiment, a method of delivering notifications is disclosed. The method can include receiving a communication at a server within an Internet Protocol Television (IPTV) network, where the communication is directed to a destination device outside of the IPTV network. The method can also include identifying the destination device and associating the destination device with a set-top box device. The method can also include transmitting a notification of the communication to the set-top box device via a private data network within the IPTV network.

In another embodiment, a method of receiving notifications is disclosed and includes receiving a notification at a set-top box device via a private data network within an Internet Protocol Television (IPTV) network, where the notification is associated with a communication to a destination device outside of the IPTV network.

Figure 1:
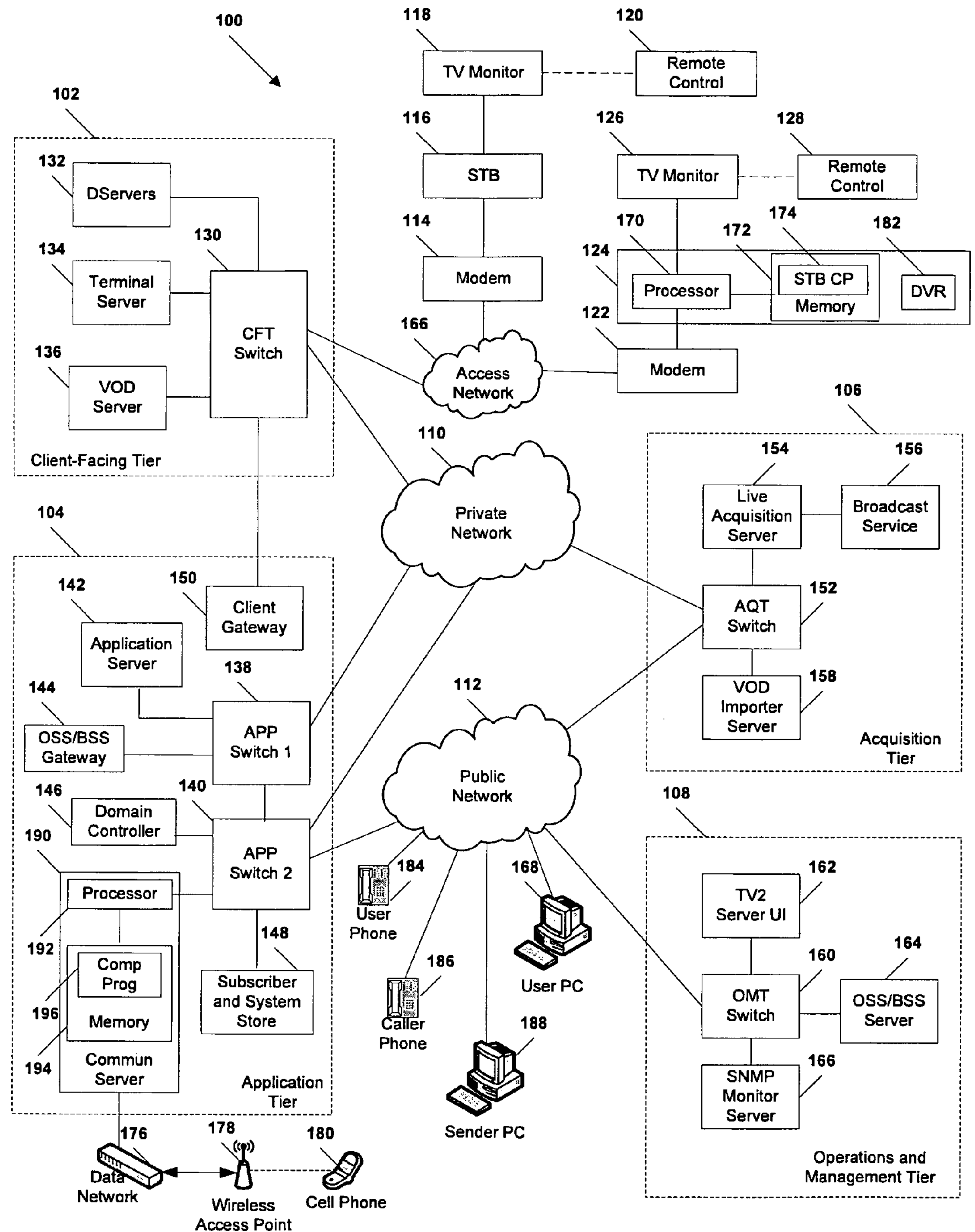
FIG. 1 is a block diagram illustrating an embodiment of an Internet Protocol Television (IPTV) system.

Referring to FIG. 1, an IPTV system is shown and is generally designated 100. As shown, the system 100 can include a client facing tier 102, an application tier 104, an acquisition tier 106, and an operations and management tier 108. Each tier 102, 104, 106, 108 is coupled to a private network 110, a public network 112, or both the private network 110 and the public network 112. For example, the client-facing tier 102 can be coupled to the private network 110. Further, the application tier 104 can be coupled to the private network 110 and to the public network 112, such as the Internet, a public switched telephone network (PSTN), a plain old telephone service (POTS) network, or an Internet Protocol (IP) phone network. The acquisition tier 106 can also be coupled to the private network 110 and to the public network 112. Moreover, the operations and management tier 108 can be coupled to the public network 112.

As shown in FIG. 1, the various tiers 102, 104, 106, 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

As illustrated in FIG. 1, the client-facing tier 102 can communicate with user equipment via a private access network 166, such as an Internet Protocol Television (IPTV) network. In an illustrative embodiment, modems, such as a first modem 114 and a second modem 122 can be coupled to the private access network 166. The client-facing tier 102 can communicate with a first representative set-top box device 116 via the first modem 114 and with a second representative set-top box device 124 via the second modem 122. The client-facing tier 102 can communicate with a large number of set-top boxes, such as the representative set-top boxes 116, 124, over a wide geographic area, such as a regional area, a metropolitan area, a viewing area, or any other suitable geographic area that can be supported by networking the client-facing tier 102 to numerous set-top box devices.

In one embodiment, the client-facing tier 102 can be coupled to the modems 114, 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116, 124 can process data received via the private access network 166, via an IPTV software platform, such as Microsoft® TV IPTV Edition.

Additionally, the first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device can communicate with a second remote control 128.

In an exemplary, non-limiting embodiment, each set-top box device 116, 124 can receive data or video from the client-facing tier 102 via the private access network 166 and render or display the data or video at the display device 118, 126 to which it is coupled. In an illustrative embodiment, the set-top box devices 116, 124 can include tuners, such as the tuner 184 shown in FIG. 1, that receive and decode television programming information for transmission to the display devices 118, 126. Further, the set-top box devices 116, 124 can include a STB processor 178 and a STB memory device 180 that is accessible to the STB processor 178. In a particular embodiment, the set-top box devices 116, 124 can also communicate commands received from the remote control devices 120, 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server 168 and other devices with a common connection point to the private network 110. In a particular embodiment, the CFT switch 130 can also be coupled to a video-on-demand (VOD) server 136.

As shown in FIG. 1, the application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116, 124 via the private access network 166, so the set-top box devices 116, 124 can provide functions, such as display, messaging, processing of IPTV data and VOD material, etc. In a particular embodiment, the OSS/BSS gateway 144 includes operation systems and support (OSS) data, as well as billing systems and support (BSS) data.

Further, the second APP switch 140 can be coupled to a domain controller 146 that provides web access or e-mail messaging, for example, to users via the public network 112. The second APP switch 140 can be coupled to a subscriber and system store 148 that includes account information, for example, account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116, 124 can access the system via the private access network 166, using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the private access network 166.

For example, when a set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, e.g., because it is connected to a different twisted pair, the client gateway 150 can deny transmissions to and from the set-top box device 116 beyond the private access network 166.

Additionally, the second APP switch 140 can be coupled to a communication server 190. The communication server 190 includes a processor 192 and a memory portion 194 accessible to the processor 192. The communication server 190 also includes a computer program embedded in the memory device 194. In a particular embodiment, the communication server 190 receives calls from caller phones 186 and transmits the calls to user phones 184 via the public network 112. Further, the call server 190 can receive voice mail messages via the public network 112. The communication server 190 can store the voice mail messages after associating them with user accounts, or the communication server 190 can transmit the voice mail messages to the subscriber and system store 148 for storage. In a particular embodiment, the communication server 190 also generates notifications of calls and voice mails and transmits the notifications to set-top box devices 116, 124 over the private access network 166.

In an illustrative embodiment, the communication server 190 can receive messages from the domain controller 146, set-top boxes 116, 124, and other components of the system 100. In a particular embodiment, the communication server 190 generates messages, such as wireless access protocol (WAP) messages, and transmits the messages to cellular phones 180 via the data network 176.

Additionally, the communication server 190 can communicate via the public network 112 with one or more user personal computers (PCs) 168 and sender PCs 188. The communication server 190 can receive e-mail messages from sender PCs 188 via the public network 112 and transmit the messages or notifications of the messages to user PCs 168 or set-top box devices 116, 124.

As indicated in FIG. 1, the acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

FIG. 1 further illustrates that the operations and management tier 108 can include an operations and management tier (OMT) switch 160 that conducts communication between the operations and management tier 108 and the public network 112. In the embodiment illustrated by FIG. 1, the OMT switch 160 is coupled to a TV2 server 162. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 can transmit the television content to the AQT switch 152, in turn, and the AQT switch 152 can transmit the television content to the CFT switch 130 via the private network 110. Further, the television content can be encoded at the D-servers 132, and the CFT switch 130 can communicate the television content to the modems 114, 122 via the private access network 166. The set-top box devices 116, 124 can receive the television content from the modems 114, 122, decode the television content, and transmit the content to the display devices 118, 126 according to commands from the remote control devices 120, 128.

Additionally, at the acquisition tier 106, the video-on-demand (VOD) importer server 158 can receive content from one or more VOD sources outside the IPTV system 100, such as movie studios and programmers of non-live content. The VOD importer server 158 can transmit the VOD content to the AQT switch 152, and the AQT switch 152, in turn, can communicate the material to the CFT switch 130 via the private network 110. The VOD content can be stored at one or more servers, such as the VOD server 136.

When a user issues a request for VOD content to a set-top box device 116, 124, the request can be transmitted over the private access network 166 to the VOD server 136, via the CFT switch 130. Upon receiving such a request, the VOD server 136 can retrieve requested VOD content and transmit the content to the set-top box device 116,124 across the private access network 166, via the CFT switch 130.

In a particular embodiment, the computer program 196 embedded within the communication server 190 can include instructions to receive a call from the caller phone 186 via the public network 112. The computer program 196 can include instructions to receive caller identification (caller ID) information with the call. Additionally, the computer program 196 can include instructions to identify the destination device of the call, for example, by querying the subscriber and system store 148 for account information corresponding to the destination telephone number. Further, the computer program 196 can include instructions to associate the user phone 184 with a set-top box device 116, 124, by querying the subscriber and system store 148 for account information corresponding to the telephone number of the user phone 184.

Additionally, the computer program 196 can include instructions to generate a notification relating to the call and transmit the notification to the user's set-top box device 116, 124 via the private access network 166. The computer program 196 can also include instructions to the notification of transmit a copy of the notification to the subscriber and system store 148 for storage via the user's account.

In an illustrative embodiment, the computer program 196 can include instructions to receive a voice mail from the caller phone 186 via the public network 112, if the call is not answered. Further, the computer program 196 can include instructions to generate a notification of the voice mail and to transmit the notification to the set-top box device 116, 124 via the private access network 166. In a particular embodiment, the computer program 196 can include instructions to receive a request for the voice mail message from the user phone 184 or a set-top box device 116, 124 and to transmit the voice mail message to the device from which the request is issued. In one embodiment, the computer program 196 can include instructions to transmit an audio file containing the voice mail message to the set-top box device 116, 124. Alternatively, the computer program 196 can include instructions to convert the message to a text message and transmit the text message to a set-top box device 116, 124. In a particular embodiment, the computer program 196 can include instructions to store the voice mail and/or the related notification or to transmit the voice mail and/or notification to the subscriber and system store 148 for storage.

Call notifications and voice mail notifications can include any information suitable for notifying the user that a telephone call is being or has been issued to the user. For example, the notification can include the caller's name, the caller's telephone number, the caller's address, the destination telephone number, any portion of caller identification information received at the communication server 190, a telephone call symbol, a telephone call audio tone, a voice mail symbol, a voice mail audio tone, a date of a call, a time of a call, a date of a voice mail message, a time of a voice mail message or any combination of these.

In another embodiment, the computer program 196 can include instructions to receive an e-mail message from the sender PC 188 via the public network 112. The computer program 196 can include instructions to identify the destination device of the e-mail, for example, by querying the subscriber and system store 148 for account information corresponding to the destination e-mail address. Further, the computer program 196 can include instructions to associate the user PC 168 with a set-top box device 116, 124, by querying the subscriber and system store 148 for account information corresponding to the e-mail address of the user phone 184.

Further, the computer program 196 can include instructions to generate a notification of the e-mail and to transmit the notification to the set-top box device 116, 124 via the private access network 166. In a particular embodiment, the computer program 196 can include instructions to receive a request for the e-mail message from the user PC 168 or a set-top box device 116, 124 and to transmit the e-mail message to the device from which the request is issued. In a particular embodiment, the computer program 196 can include instructions to store the voice mail and/or the related notification or to transmit the voice mail and/or notification to the subscriber and system store 148 for storage.

The e-mail notification can include any information suitable for notifying the user that an e-mail message has been transmitted to the user. For example, the notification can include the sender's name, the sender's e-mail address, a subject of the e-mail message, thumbnail images of any picture attachments, a portion of the e-mail message text, an e-mail symbol, an e-mail audio tone, or any combination of these.

In an additional embodiment, the computer program 196 can include instructions to receive messages from set-top box devices 116, 124 via the private access network 166. The computer program 196 can include instructions to store the messages or transmit the messages to the subscriber and system store 148 for storage. Additionally, the computer program 196 can include instructions to use information in a message and information associated with a set-top box device 116, 124 that sends the message (such as an IP address of the set-top box device, data associated with one or more twisted pairs or fiber optic cables coupled to the set-top box device, or an identifier of the set-top box device) to identify a destination device for the message. Moreover, the computer program 196 can include instructions to transmit the message over the data network 176 to the cell phone 180 via the wireless access point 178.

For example, if the communication server 190 receives a message regarding the status of a digital video recorder (DVR) within the set-top box device 116, in conjunction with a user-selected destination named 'my cell phone,' the communication server 190 can query the subscriber and information store 148 for account information associated with the set-top box device 116. The account information can associate the set-top box device 116, for example, with the cell phone 180. The message server 192 can transmit the DVR status message over the data network 176 to the cell phone 180 via the wireless access point 178. In an illustrative embodiment, the status can be sent via a wireless access protocol (WAP).

In a particular embodiment, a set-top box device, such as the second set-top box device 124, can include a processor 170 and a memory device 172 that is accessible to the processor 170. The set-top box device 124 also includes a computer program 174 that is embedded within the memory device 172. In a particular embodiment, the computer program 174 can contain instructions to receive notifications of phone calls, e-mail messages, and voice mail messages from the IPTV system 100 via the private access network 166.

In a particular embodiment, the computer program 174 can include instructions to receive a notification of a communication to a destination device outside of the IPTV system, such as the user phone 184 or the user PC 168. Further, the computer program 174 can include instructions to store the notification. Additionally, the computer program 174 can include instructions to transmit the notification to a display device 126.

In an illustrative embodiment, the computer program 174 can include instructions to transmit a menu of at least one stored message and/or notification to the television monitor 126. For example, a user can request a menu of stored messages and notifications by issuing a command from a remote control device 128 to the second set-top box device 124. The computer program 174 can include instructions to receive a selection of a stored message or notification via the menu and to transmit the selected stored message or notification to the display device 126. When messages and notifications are stored at the second set-top box device 124, they are retrieved from the memory device 172. When messages are not stored at the second set-top box device 124, computer program 174 can include instructions to receive menu constituents and selected messages and notifications from the call server 190, the domain controller 146, and/or the subscriber and system store 148.

In an illustrative embodiment, the computer program 174 can include instructions to communicate a message from the set-top box device 124 that communicates with the IPTV system 100 to a communication device outside the IPTV system 100, such as the cellular phone 180. For example, the computer program 174 can include instructions to monitor the digital video recorder (DVR) 182 within the set-top box device 124. The computer program 174 can include instructions to communicate a message to the cellular phone 180 via the IPTV system 100, when the DVR 182 reaches a certain status, such as having started or finished recording a specific program.

Figure 2:
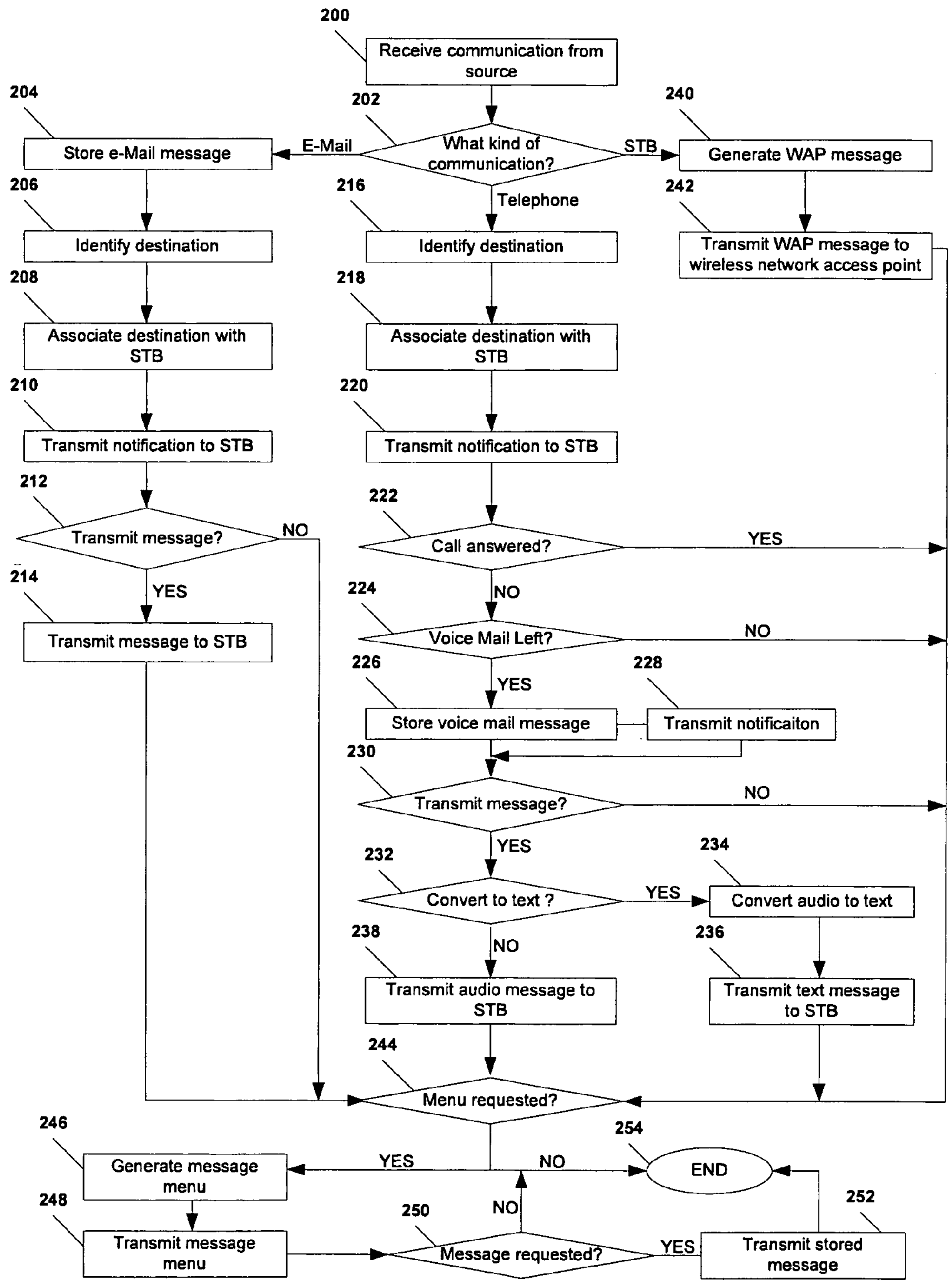
FIG. 2 is a flow diagram illustrating an embodiment of a method of delivering notifications over an IPTV system.

Referring to FIG. 2, a method of delivering notifications is shown. At block 200, a server within an Internet Protocol Television (IPTV) system receives a communication from a source device. A communication can include, for example, a phone call, an e-mail message, or a voice mail message, that is issued from a source device outside the IPTV system to a destination device outside of the IPTV system. In a particular embodiment, the communication can be received at the server via a public network, such as the Internet, a public switched telephone network (PSTN), a plain old telephone service (POTS) network, or an Internet Protocol (IP) phone network. In another embodiment, the communication can be a message intended for a destination device outside the IPTV system received from a set-top box device that communicates with the server via the IPTV system.

Proceeding to decision step 202, the type of communication received is determined at the server. If it is determined that the communication is an e-mail message, the method continues to block 204, and the e-mail message can be stored in a memory portion at the server or at a device coupled to the server. Moving to block 206, the destination of the e-mail message is determined at the server. For example, the destination can be an e-mail address or IP address corresponding to a user computer outside of the IPTV system. Continuing to block 208, the server associates the destination with a set-top box device. In an illustrative embodiment, the server can communicate with an information store, such as the subscriber and system store shown in FIG. 1, that contains user account information associating various set-top box devices with various destinations. For instance, the information store can relate data associated with destination devices, such as an IP address of a user computer with data relating to the set-top box device, such as an IP address of the set-top box device, data associated with one or more twisted pairs connected with the set-top box device, data associated with one or more fiber optic cables coupled to the set-top box device, an alphanumeric identifier of the set-top box device, any other data that is suitable for associating a set-top box device with a user account, or any combination of these.

Moving to block 210, a notification of the e-mail message is transmitted from the server to the set-top box device via a private network within the IPTV system. In a particular embodiment, the notification can be transmitted from the set-top box device to a display device, such as a television monitor. The notification can include any information suitable for notifying the user that an e-mail message has been transmitted to the user. For example, the notification can include the sender's name, the sender's e-mail address, a subject of the e-mail message, thumbnail images of any picture attachments, a portion of the e-mail message text, an e-mail symbol, an e-mail audio tone, or any combination of these. One example of an e-mail message notification is disclosed with reference to FIG. 5.

Continuing to decision step 212, a selection to receive the full text of the e-mail message can be received at the server from the set-top box device. In an illustrative embodiment, a user can issue a command to the set-top box device via a remote control to display the text of the e-mail message, and the command can be transmitted to the server. If the server receives a command to transmit the text of the e-mail message, the method proceeds to block 214, and the message is transmitted to the set-top box device for display to the user. If such a command is not received at the server, the method may continue to decision step 244.

Returning to decision step 202, if the communication received at the server is a telephone call, the method proceeds to block 216, and the destination is identified at the server. For example, the destination can be a telephone number corresponding to a user phone outside of the IPTV system. Continuing to block 218, the server associates the destination with a set-top box device. In an illustrative embodiment, the server can communicate with an information store, such as the subscriber and system store shown in FIG. 1, that relates the telephone number of a user phone, with data relating to the user's set-top box device.

Moving to block 220, a notification of the telephone call is transmitted from the server to the set-top box device via a private network within the IPTV system. In a particular embodiment, the notification can be transmitted from the set-top box device to a display device, such as a television monitor. The notification can include any information suitable for notifying the user that a telephone call is being issued to the user. For example, the notification can include the caller's name, the caller's telephone number, the destination telephone number, any portion of caller identification information received at the server, a telephone call symbol, a telephone call audio tone, or any combination of these. One example of a telephone call notification is disclosed with reference to FIG. 4.

At decision step 222, the server can determine whether the telephone call is answered. If the call is answered, the method proceeds to decision step 244 and continues as described. If the call is not answered, the method moves to decision step 224, and it can be determined whether the caller has left a voice mail at the server. If a voice mail is not received at the server, the method moves to decision step 244 and continues as described. Conversely, when a voice mail is left at the server, the method moves to block 226, and the voice mail is stored in a memory portion at the server or at a device to which the server is coupled.

Continuing to block 228, the server transmits a notification of the voice mail to the set-top box device. The notification can include any information suitable for notifying the user that a voice mail has been left for the user. For example, the notification can include the caller's name, the caller's telephone number, any portion of caller identification information received at the server, a voice mail symbol, a voice mail audio tone, or any combination of these.

At decision step 230, a selection to receive the voice mail message is received at the server from the set-top box device via the private network within the IPTV system. In an illustrative embodiment, a user can issue a command to the set-top box device via a remote control to broadcast the voice mail message, and the command can be transmitted to the server. If the server does not receive a command to transmit the voice mail message, the method continues to decision step 244. If the server receives a command to transmit the voice mail message, the method proceeds to decision step 232, and it is determined whether a command to convert the voice mail to text is received at the server. When a command to convert the voice mail to text is received, the server can convert the audio voice mail message to a text message at block 234. The method then moves to block 236, and the text message is transmitted to the set-top box device via the private network within the IPTV system. The method can then proceed to decision step 244. One example of the text of a voice mail message is disclosed with reference to FIG. 7.

Returning to decision step 232, if a command to convert the voice mail message to text is not received, the method continues to block 238, and the server transmits the audio voice mail message to the set-top box device via the private network within the IPTV system. In a particular embodiment, the audio message can be transmitted to a display device and broadcast through speakers coupled to the display device. Alternatively, the audio message can be broadcast through speakers coupled to the set-top box device. The method can then proceed to decision step 244.

Returning to decision step 202, it can be determined that the server has received a communication from a set-top box device. For example, the server can receive a message regarding the status of a program or of a digital video recorder within the set-top box device. In a particular embodiment, if the server determines that a set-top box communication has been received, the method can move to block 240, and the server can generate a message, such as a wireless access protocol (WAP) message that can be transmitted to a wireless device via a wireless network. In this embodiment, the WAP message can be transmitted to the wireless network at block 242. The method can then proceed to decision step 244.

Proceeding to decision step 244, the server can determine whether a request for a menu of messages has been received. For instance, a user can issue a command to the set-top box device via a remote control requesting a menu of messages from a previous time period, and the set-top box can transmit the request to the server. If no menu has been requested, the method ends at state 254. On the other hand, if a request is received at the server, a menu of stored messages is generated at block 246. The menu can include, for example, data relating to all telephone calls, voice mail messages, and e-mail messages received in the last three days, received from a particular party, and the like. The server transmits the menu to the set-top box device at block 248. One example of a menu is disclosed with reference to FIG. 6.

Continuing to decision step 250, the server can determine whether a message from the menu is requested. For example, a user can select a message by issuing a command to the set-top box device, and the selection can be transmitted to the server. If no message is selected, the method ends at state 254. Conversely, if a selection of a message is received at the server, the server can retrieve the message from its memory portion and transmit the message to the set-top box device at block 252. The method ends at state 254.

Figure 3:
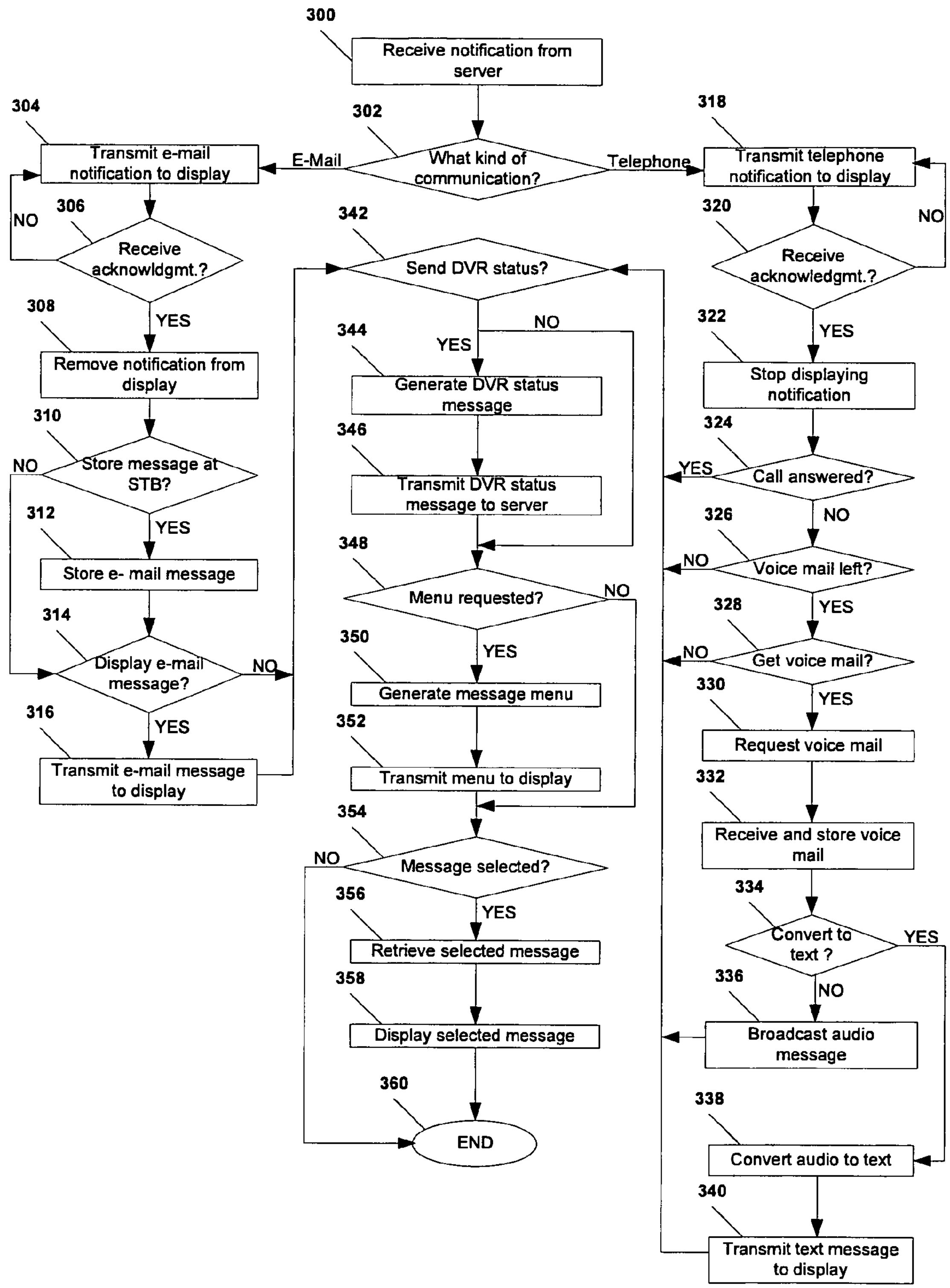
FIG. 3 is a flow diagram illustrating an embodiment of a method of receiving notifications over an IPTV system.

Referring to FIG. 3, a method of receiving notifications is shown. At block 300, a notification of a communication if received at a set-top box from a server. The set-top box can receive the notification form the server via a private network within an IPTV system. The notification can be associated with a communication from a source device outside the IPTV system to a destination outside the IPTV system.

At decision step 302, the type of message for which the set-top box has received a notification is determined. If the notification is associated with an e-mail message received at the server, the method proceeds to block 304, and the set-top box transmits the e-mail notification to a display device. The notification can include any information suitable for notifying the user that an e-mail message has been transmitted to the user. For example, the notification can include the sender's name, the sender's e-mail address, a subject of the e-mail message, thumbnail images of any picture attachments, a portion of the e-mail message text, an e-mail symbol, an e-mail audio tone, or any combination of these.

Moving to decision step 306, the set-top box can prompt the user for an acknowledgement of the notification. For example, the set-top box can transmit a user interface to the display device, which includes the notification and soft buttons that the user can select to indicate that the notification has been seen, that the message should be saved or deleted, and the like. In a particular embodiment, the e-mail notification can be displayed until an acknowledgement is received. After the acknowledgement is received, the method continues to block 308, and the set-top box can remove the notification from display or cease transmitting the notification for display.

At decision step 310, the set-top box can determine whether to store the e-mail message. In one embodiment, a command to save the message or not save the message can be received from a user via a remote control device that communicates with the set-top box device. The command can be issued by selecting soft buttons on a user interface or by pressing designated keys on the remote control. If a command to store the e-mail message at the set-top box device is not received, the method proceeds to decision step 314. On the other hand, if a command to store the message is received, the method moves to block 312, and the message is stored. The message can be stored at the set-top box device and/or at a device within the IPTV system. The message then proceeds to decision step 314.

Moving to decision step 314, the user can be prompted to determine whether or not to view the e-mail message. If the set-top box receives a command to not display the e-mail message, the method proceeds to decision step 342. Conversely, if the set-top box device receives a command to display the text of the e-mail message, the set-top box device transmits the e-mail message to a display device at block 316, and the method proceeds to decision step 342.

Returning to decision step 302, if the set-top box device determines that a telephone call notification has been received, the method moves to block 318, and the telephone notification is transmitted to the display device. For example, the notification can include the caller's name, the caller's telephone number, the destination telephone number, any portion of caller identification information received at the server, a telephone call symbol, a telephone call audio tone, or any combination of these.

Moving to decision step 320, the set-top box can prompt the user for an acknowledgement of the notification. For example, the set-top box can transmit a user interface to the display device, which includes the notification and soft buttons that the user can select to indicate that the notification has been seen, that the message should be saved or deleted, and the like. In a particular embodiment, the telephone call notification can be displayed until an acknowledgement is received. After the acknowledgement is received, the method continues to block 322, and the set-top box can remove the notification from display or cease transmitting the notification for display.

Continuing to decision step 324, the set-top box device can determine whether the telephone call has been answered. In one embodiment, the set-top box device can receive an indication from the server that transmitted the notification whether or not the call was answered. If the call is answered, the method can continue to decision step 342. Alternatively, if the call is not answered, the method can proceed to decision step 326, and the set-top box device can determine whether a voice mail has been left at the server. For instance, the set-top box device can receive an indication from the server of whether or not a voice mail has been left by the caller. When a voice mail has not been left, the method can proceed to decision step 342. On the other hand, when a voice mail is left, the set-top box device can prompt the user at decision step 328 to decide whether to retrieve the voice mail from the server.

In a particular embodiment, if the user decides not to retrieve the voice mail message, the method proceeds to decision step 342. Conversely, if the user decides to retrieve the voice mail message, the method continues to block 330 and the set-top box requests the voice mail from the server. The voice mail message is received and stored at the set-top box device at block 332. Moving to decision step 334, the set-top box device can prompt the user to decide whether the voice mail message should be broadcast as an audio message or converted to a text message. If a command to convert the message to text is received at the set-top box device, the method proceeds to block 338, and the audio message can be converted to text by a computer program embedded within the set-top box device. The text message is transmitted to the display device at block 340, and the method proceeds to decision step 342. Returning to decision step 334, if a command not to convert the audio message to text is received, the voice mail message can be broadcast at block 336. In one embodiment, the voice mail message can be transmitted as an audio message to the display device for broadcast to the user. In another embodiment, the set-top box device can broadcast the voice mail message to the user.

In an illustrative embodiment, the set-top box device can determine at decision step 342 whether to send a communication, such as a status of a DVR within the set-top box device, to the server. In this embodiment, if no command to send a DVR status to the server has been received or set by the user, the method can proceed to decision step 348. Alternatively, if a command to transmit the DVR status has been received or set by the user, the method proceeds to block 344, and the set-top box device generates a DVR status message via a computer program embedded within a memory portion of the set-top box device. At block 346, the DVR status message is communicated to the server via the private network within the IPTV system.

Moving to decision step 348, the set-top box device can determine whether a user has requested a menu of messages. When a menu is requested, for instance, from a remote control device communicating with the set-top box device, the set-top box device can generate a menu of prior messages at block 350 and transmit the menu to the display device at block 352. The menu can include, for example, data relating to all telephone calls, voice mail messages, and e-mail messages received in the last three days, received from a particular party, and the like.

Continuing to decision step 354, the set-top box device can determine whether a message from the menu is requested. For example, a user can select a message by issuing a command to the set-top box device using a remote control. If no message is selected, the method ends at state 360. On the other hand, if a selection of a message is received at the set-top box, the set-top box can retrieve the message from its memory portion and transmit the message to the display device at block 358. The method ends at state 360.

Figure 4:
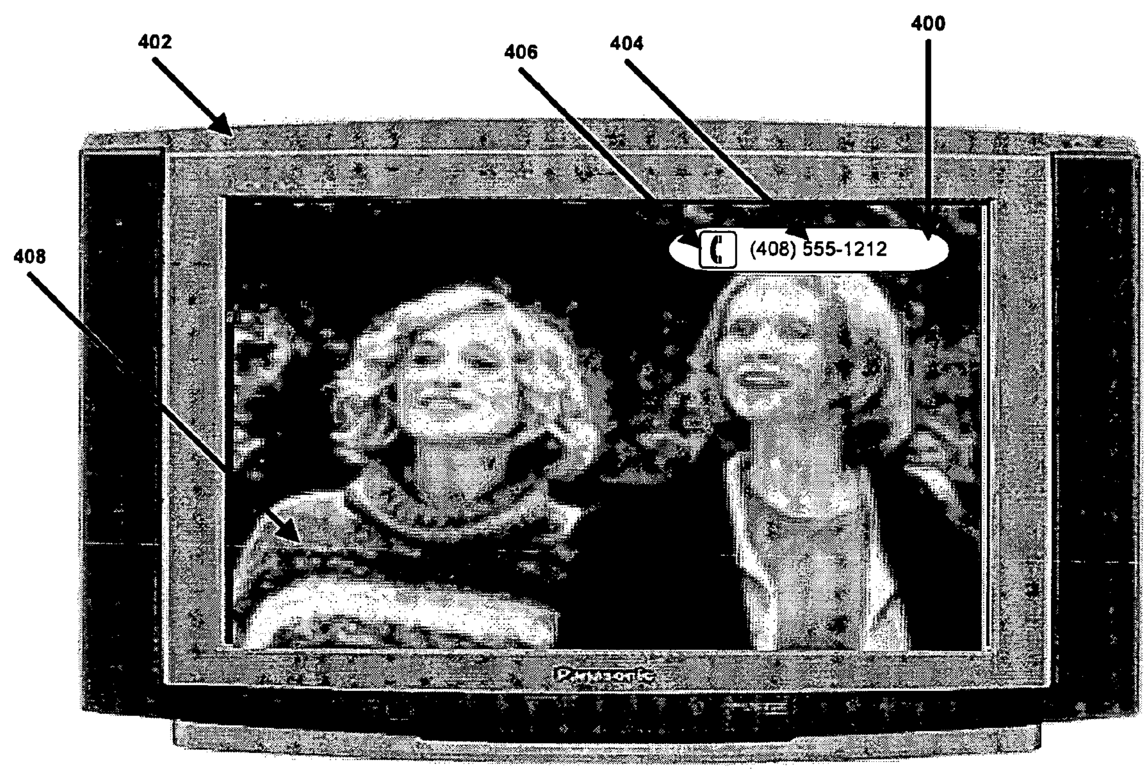
FIG. 4 is a diagram of an embodiment of a graphical user interface to receive notifications.

Referring to FIG. 4, a diagram of an embodiment of a user interface to receive notifications is shown at 400. The user interface 400 can be displayed at a display device, such as a television monitor 402. In the embodiment shown in FIG. 4, the user interface 400 includes a telephone call notification. The user interface 400 can overlay television content 408 and can contain multiple types of information. For example, the user interface 400 for the telephone call notification can include a caller or destination telephone number 404 and a telephone call symbol 406.

Figure 5:
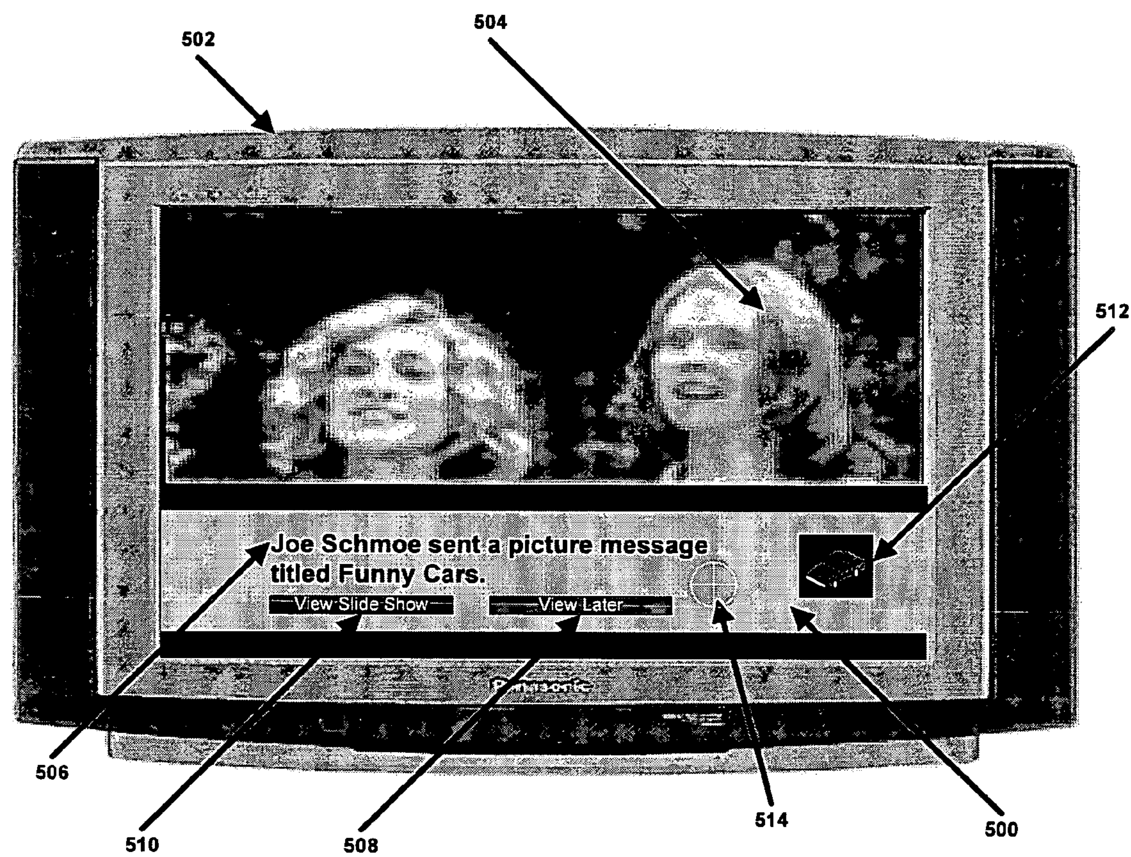
FIG. 5 is diagram of an embodiment of a graphical user interface to receive notifications.

Referring to FIG. 5, a diagram of a second embodiment of a user interface to receive notifications is shown at 500. The user interface 500 can be displayed at a display device, such as a television monitor 502. In the embodiment shown in FIG. 5, the user interface 500 includes an e-mail message notification. The user interface 500 can overlay television content 504 and can contain multiple types of information. For example, the user interface 500 for an e-mail message notification can include a statement 506 indicating a sender name and subject of the e-mail message. In a particular embodiment, the user interface 500 can also indicate whether a picture attachment or presentation is attached to the e-mail message, by displaying a first attached picture 512 or a picture indicator.

In an illustrative embodiment, the user interface 500 can include selectable commands that a user can select by manipulating a cursor 514. In a particular embodiment, the user interface 500 can include a soft button 508 that a user can select to indicate a decision to view the e-mail message at a later time. When pictures are attached to the e-mail message, the user interface 500 can include a soft button 510 that a user can select to indicate a decision to view a slide show of pictures attached to the e-mail message. Examples of other soft buttons include buttons indicating whether to store, delete, or display the text of the e-mail message.

Figure 6:
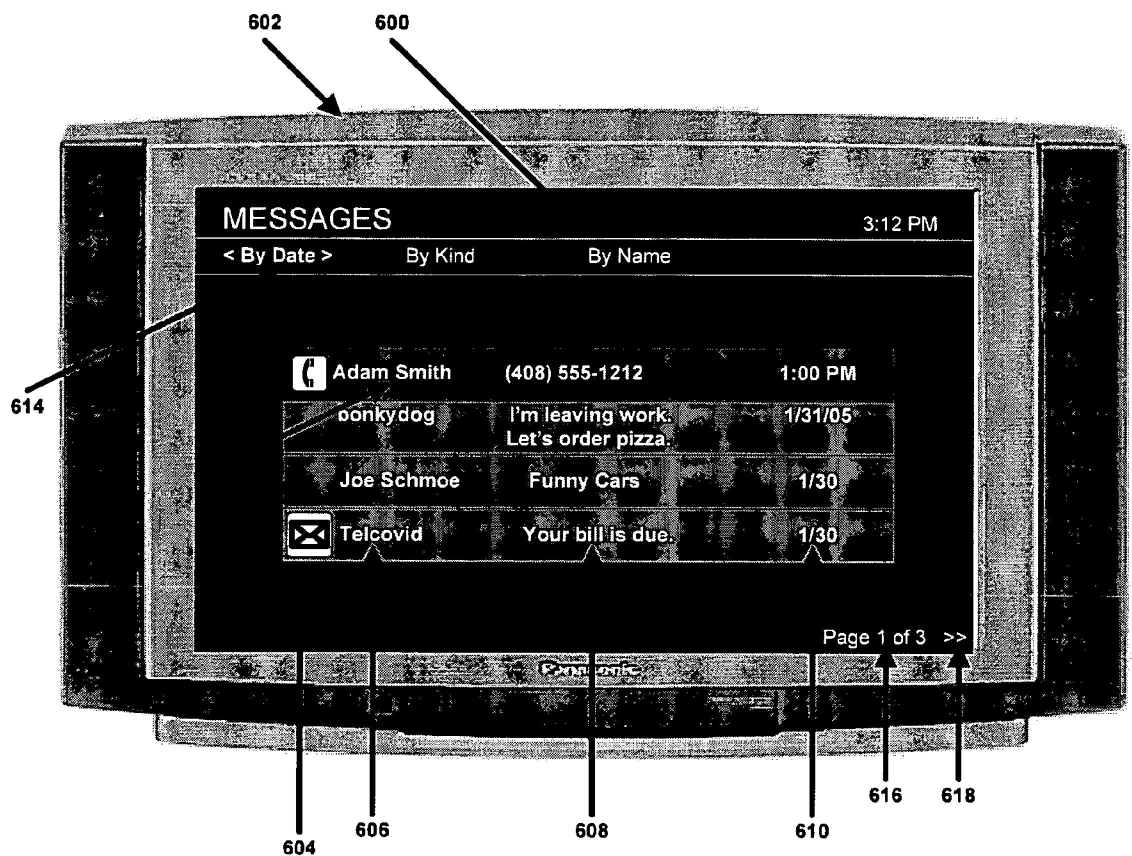
FIG. 6 is a diagram of an embodiment of a graphical user interface to receive notifications.

Referring to FIG. 6, a diagram of a third embodiment of a user interface to receive notifications is shown at 600. The user interface 600 can be displayed at a display device, such as a television monitor 602. In the embodiment shown in FIG. 6, the user interface 600 includes a menu of messages stored at a server and/or set-top box device. The user interface 600 can contain multiple types of information for each stored message on the menu. For example, the user interface 600 can contain a symbol 604 indicating the type of message. Additionally, the user interface 600 can include the name of the sender 606 of the message. The user interface 600 can further include a subject 608 of each message. Moreover, the user interface 600 can include a date or time of receipt 610 of each message.

In a particular embodiment, a user may select a message on the menu by manipulating a highlight bar 612, using UP, DOWN, and ENTER keys, for example, on a remote control. Further, a user can sort messages on the menu by highlighting a sorting criteria 614, such as 'by date' or 'by name' on the user interface 600. If the messages on the menu are too great to be displayed on one screen, the current and total number of menu pages 616 can be displayed in conjunction with selectable symbols indicating a next page 618 or a previous page.

Figure 7:
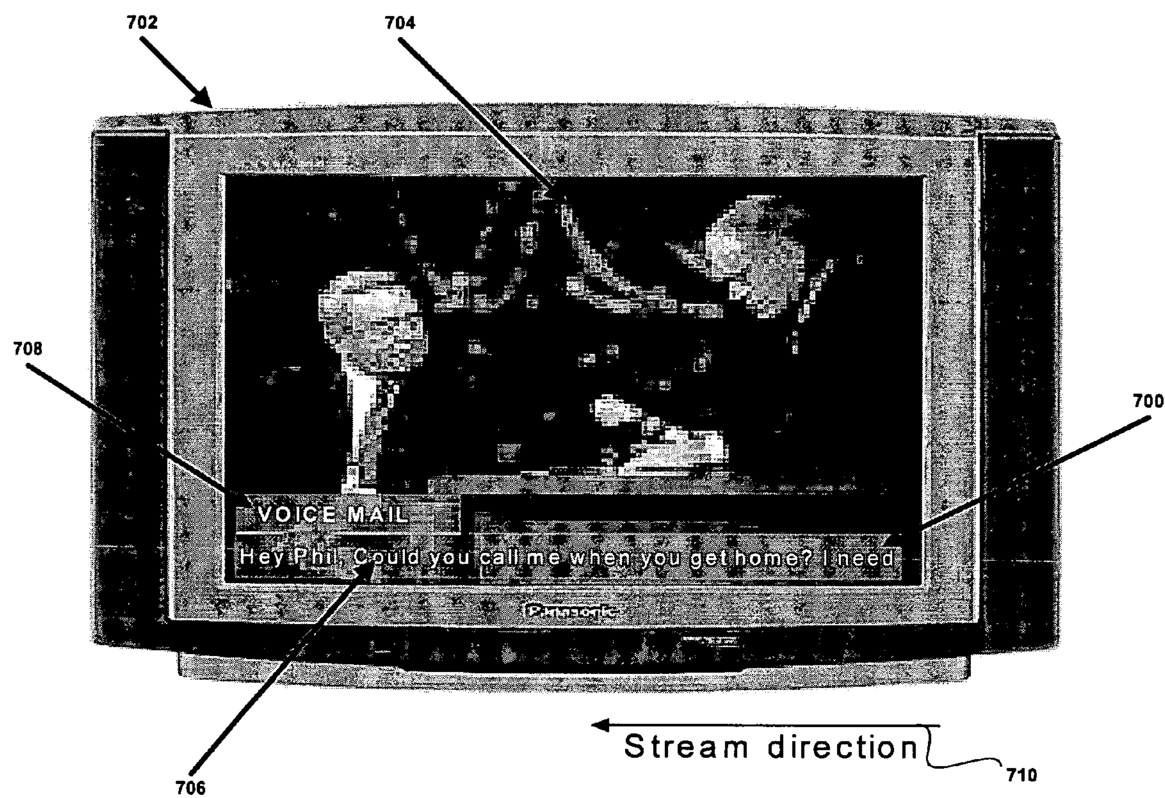
FIG. 7 is a diagram of an embodiment of a graphical user interface to receive notifications.

Referring to FIG. 7, a diagram of a fourth embodiment of a user interface to receive notifications is shown. The user interface 700 can be provided on a television monitor 702. The user interface 700 can overlay a display region 704 that displays television content. In a particular embodiment, the user interface 700 can include a message content region 706 that displays content of a message, such as the text of an e-mail message, or a text message converted from a voice message. In an illustrative embodiment, the content is displayed as streaming text that overlays the television content in the display region 704 and moves from right to left, as indicated by arrow 710.

As shown in FIG. 7, the user interface can include a tag region 708 that displays header information for each message displayed in the message content region 706. The tag region 708 can be appended to the message content region 706. In an illustrative embodiment, header information in the tag region 708 can include indicators of the type of message being displayed, e.g., 'Voice Mail' or 'e-Mail.' Moreover, the header information can also include other information, such as the source, date, time, or subject of the message, as well as return information or other identifying indicia.

In a particular embodiment, the television content displayed in the display region 704 continues uninterrupted, while the message content is displayed in the message content region 706 and while any header information is displayed in the tag region 708.

Figure 8:
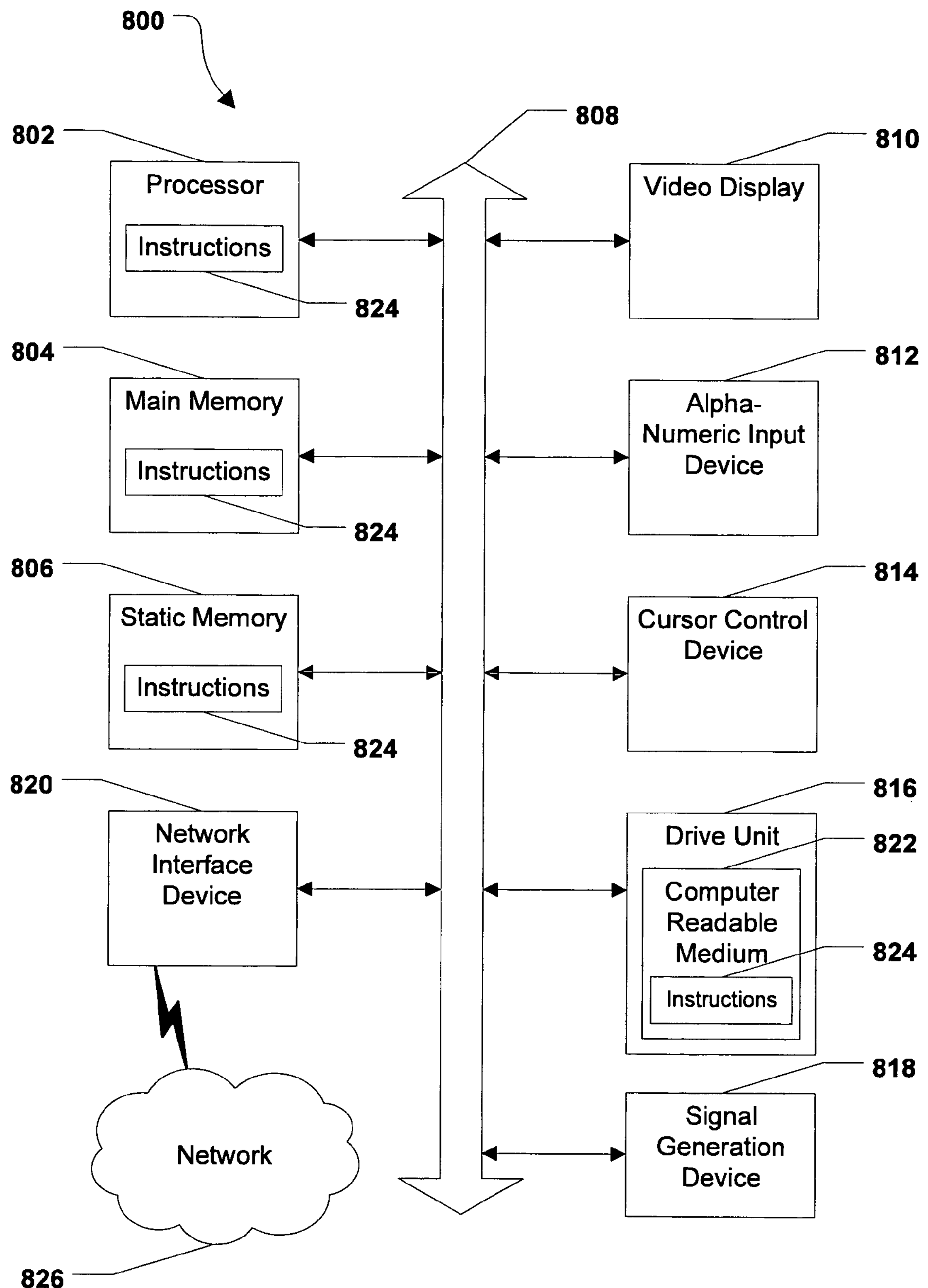
FIG. 8 is a diagram of an embodiment of a general computer system.

Referring to FIG. 8, an illustrative embodiment of a general computer system is shown and is designated 800. The computer system 800 can include a set of instructions that can be executed to cause the computer system 800 to perform any one or more of the methods or computer based functions disclosed herein. The computer system 800, or any portion thereof, may operate as a standalone device or may be connected, e.g., using a network, to other computer systems or peripheral devices, including a server or set-top box device, as shown in FIG. 1.

In a networked deployment, the computer system may operate in the capacity of an IPTV server or set-top box device. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics-processing unit (GPU), or both. Moreover, the computer system 800 can include a main memory 804 and a static memory 806 that can communicate with each other via a bus 808. As shown, the computer system 800 may further include a video display unit 810, such as a liquid crystal display (LCD), an organic light emitting diode (OLED), a flat panel display, a solid state display, or a cathode ray tube (CRT). Additionally, the computer system 800 may include an input device 812, such as a keyboard, and a cursor control device 814, such as a mouse. Further, the computer system 800 can include a wireless input device 815, e.g., a remote control device. The computer system 800 can also include a disk drive unit 816, a signal generation device 818, such as a speaker or remote control, and a network interface device 820.

In a particular embodiment, as depicted in FIG. 8, the disk drive unit 816 may include a computer-readable medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal, so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In a particular embodiment, the steps of the methods described herein are executed in the order shown by the figures. In alternative embodiments, the steps may be executed in alternative sequences. For example, menus of previous messages can be requested and generated prior to receiving new notifications at the set-top box device or server. Additionally, messages regarding DVR status can be transmitted from the set-top box device to the server prior to receiving new notifications at the set-top box device.

In conjunction with the configuration of structure described herein, the system and method disclosed provide notifications of various communications and messages on an IPTV platform, over an IPTV system. Integration of communication and messaging functions, as well as functions such as caller identification are integrated at a central location that communicates with the set-top box device through the IPTV system. Moreover, messages can be stored at the server and/or set-top box device for access by users at a later time. Further, communications from the set-top box device can be sent back through the network and can be transmitted to devices on other networks, such as wireless phones.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of delivering notifications, the method comprising:

receiving a voice mail message at a server within a television network, the voice mail message directed to a destination device;

identifying the destination device;

associating the destination device with a set-top box device, wherein the destination device and the set-top box device are different devices;

transmitting a notification of the voice mail message to the set-top box device via a data network of the television network;

receiving a response to the notification at the server via the set-top box device, wherein the response includes a command to convert the voice mail to text;

executing the command via the server to convert the voice mail to text;

sending the text to the set-top box device from the server;

receiving an e-mail message at the server, the e-mail message directed to a second destination device outside of the television network;

identifying the second destination device;

associating the second destination device with the set-top box device; and transmitting an e-mail notification of the e-mail message to the set-toe box device via the data network, wherein the e-mail notification indicates whether the e-mail includes an attachment.

2. The method of claim 1, further comprising:

associating the destination device with a user account; and associating the user account with an identifier of the set-top box device, wherein the identifier is: an IP address of the set-top box device, data associated with a communication line coupled to the set-top box device, or an alphanumeric identifier of the set-top box device.

3. The method of claim 1, wherein the set-top box device sends the notification to a display device coupled to the set-top box device.

4. The method of claim 1, wherein the set-top box device sends the text to a display device coupled to the set-top box device.

5. The method of claim 1, further comprising:

receiving a status message regarding a status of a digital video recorder from the set-top box device; and transmitting the status message to a wireless device.

6. The method of claim 1, further comprising storing the voice mail message at the server.

7. The method of claim 1, further comprising:

generating a menu that includes a stored message; and transmitting the menu to the set-top box device.

8. The method of claim 7, further comprising:

receiving a selection of the stored message;

retrieving the stored message from a message store; and transmitting the stored message to the set-top box device.

9. A computer-readable storage device comprising instructions executable by a processor to perform operations including:

receiving, at a server within a television network, a voice mail message directed to a destination device;

identifying the destination device;

associating the destination device with a set-top box device, wherein the destination device and the set-top box device are different devices;

transmitting a notification of the voice mail message to the set-top box device via a data network of the television network;

receiving a response to the notification via the set-top box device, wherein the response includes a command to convert the voice mail to text;

executing the command via the server to convert the voice mail to text;

sending the text to the set-top box device from the server;

receiving an e-mail message at the server, the e-mail message directed to a second destination device outside of the television network;

identifying the second destination device;

associating the second destination device with the set-top box device; and transmitting an e-mail notification of the e-mail message to the set-top box device via the data network, wherein the e-mail notification indicates whether the e-mail includes an attachment.

10. The computer-readable storage device of claim 9, wherein the operations further comprise:

associating the destination device with a user account; and associating the user account with an identifier of the set-top box device, wherein the identifier is: an IP address of the set-top box device, data associated with a communication line coupled to the set-top box device, or an alphanumeric identifier of the set-top box device.

11. The computer-readable storage device of claim 9, wherein the operations further comprise:

receiving a status message regarding a status of a digital video recorder from the set-top box device; and transmitting the status message to a wireless device.

12. A system comprising:

a processor of a server within a television network; and a memory accessible to the processor, the memory including instructions executable by the processor to:

receive a voice mail message directed to a destination device;

identify the destination device;

associate the destination device with a set-top box device, wherein the destination device and the set-top box device are different devices;

transmit a notification of the voice mail message to the set-top box device via a data network of the television network;

receive a response to the notification via the set-top box, wherein the response includes a command to convert the voice mail to text;

execute the command via the server to convert the voice mail to text;

send the text to the set-top box device from the server;

receive an e-mail message at the server, the e-mail message directed to a second destination device outside of the television network;

identify the second destination device;

associate the second destination device with the set-top box device; and transmit an e-mail notification of the e-mail message to the set-top box device via the data network, wherein the e-mail notification indicates whether the e-mail includes an attachment.

13. The system of claim 12, wherein the set-top box device sends the notification to a display device coupled to the set-top box device.

14. The system of claim 12, wherein the instructions are executable by the processor to:

receiving a status message regarding a status of a digital video recorder from the set-top box device; and transmitting the status message to a wireless device.

15. The system of claim 12, wherein the instructions are executable by the processor to transmit a second command to play the voice mail message and send the voice mail message to set-top box device.

16. The method of claim 8, wherein the stored message comprises a second voice mail message.

17. The method of claim 16, wherein the second voice mail message is the voice mail message.

18. The method of claim 8, wherein the stored message comprises a second e-mail message.

* * * * *